US012307769B2

(12) United States Patent
Aelmore et al.

(10) Patent No.: US 12,307,769 B2
(45) Date of Patent: May 20, 2025

(54) SYSTEM AND METHOD FOR EFFICIENT FILTERING, CLUSTERING, TRACKING AND PERSISTENT MOTION DETECTION FOR EVENT CAMERAS

(71) Applicant: United States of America as represented by the Secretary of the Navy, San Diego, CA (US)

(72) Inventors: Stephanie Lilith Aelmore, San Diego, CA (US); Richard Christopher Ordoñez, San Diego, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 440 days.

(21) Appl. No.: 18/045,608

(22) Filed: Oct. 11, 2022

(65) Prior Publication Data
US 2024/0119734 A1    Apr. 11, 2024

(51) Int. Cl.
| | |
|---|---|
| *G06T 7/11* | (2017.01) |
| *G06T 7/20* | (2017.01) |
| *G06V 10/30* | (2022.01) |
| *G06V 10/762* | (2022.01) |
| *G06V 20/40* | (2022.01) |

(52) U.S. Cl.
CPC ............... *G06V 20/44* (2022.01); *G06T 7/11* (2017.01); *G06T 7/20* (2013.01); *G06V 10/30* (2022.01); *G06V 10/762* (2022.01); *G06T 2207/20024* (2013.01); *G06V 2201/07* (2022.01)

(58) Field of Classification Search
CPC ...... G06V 20/44; G06V 10/30; G06V 10/762; G06V 2201/07; G06V 10/62; G06V 20/52; G06T 7/11; G06T 7/20; G06T 2207/20024
See application file for complete search history.

(56) References Cited

U.S. PATENT DOCUMENTS

| | | | |
|---|---|---|---|
| 2017/0177287 A1* | 6/2017 | Jeong | H04N 7/181 |
| 2020/0265590 A1 | 8/2020 | Daniilidis et al. | |

FOREIGN PATENT DOCUMENTS

| | | | | | |
|---|---|---|---|---|---|
| CN | 101374200 A | * | 2/2009 | ............ | G06F 16/70 |
| CN | 105580357 A | * | 5/2016 | ............ | G06F 16/51 |
| CN | 114926494 A | * | 8/2022 | | |

OTHER PUBLICATIONS

J.P.R. Gómez, A.G. Eguíluz, J.R. Martínez-de Dios and A. Ollero; "Asynchronous Event-Based Clustering and Tracking for Intrusion Monitoring in UAS", IEEE International Conference on Robotics and Automation (ICRA 2020), May 2020.
(Continued)

*Primary Examiner* — Huo Long Chen
(74) *Attorney, Agent, or Firm* — Naval Information Warfare Center, Pacific; Kyle Eppele; Paul C. Oestreich

(57) ABSTRACT

The invention is a system and method for efficient filtering, clustering, tracking and persistent motion detection for event cameras. More particularly, embodiments of the present invention combine compatible asynchronous event filtering and clustering techniques in a computationally efficient way to identify and track objects in the field of view that exhibit persistent motion characteristic of marine vessels, cars, aircraft, and other vehicles while ignoring dynamic background elements that move in a more erratic fashion.

23 Claims, 5 Drawing Sheets
(4 of 5 Drawing Sheet(s) Filed in Color)

(56) References Cited

OTHER PUBLICATIONS

T. Stoffregen and L. Kleeman; "Simultaneous Optical Flow and Segmentation (SOFAS) using Dynamic Vision Sensor", arXiv:1805.12326v1 [cs.CV], May 31, 2018.
A. Mitrokhin, C. Fermüller, C. Parameshwara and Y. Aloimonos; "Event-Based Moving Object Detection and Tracking", arXiv:1803.04523v3 [cs.CV], Jan. 12, 2020.
R. Benosman, S.H. Ieng, C. Clercq, C. Bartolozzi and M. Srinivasan; "Asynchronous Frameless Event-Based Optical Flow", Neural Networks 27 (2012), pp. 32-37, 2012.

\* cited by examiner

SYSTEM AND METHOD FOR EFFICIENT FILTERING, CLUSTERING, TRACKING AND PERSISTENT MOTION DETECTION FOR EVENT CAMERAS

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice: (619) 553-5118; email: ssc_pac_t2@navy.mil. Reference Navy Case Number 210764.

BACKGROUND OF THE INVENTION

Field of the Invention: The present invention relates generally to event cameras (also known as neuromorphic cameras, silicon retina, dynamic vision sensors, or simply "sensors"). More particularly, this invention relates to systems and methods efficient filtering, clustering, tracking and persistent motion detection for event cameras.

Description of Related Art: In a conventional camera an entire image (i.e., the light intensity at each pixel) is recorded at a pre-assigned interval, called the frame rate. While this works well in representing the "real world" when displayed on a video screen or monitor, recording the entire image every time increment typically oversamples parts of the image that have not changed. Thus, with frame-based cameras lots of unnecessary data is acquired, especially at high frame rates. In contrast, the most dynamic part of the image is generally under-sampled with conventional cameras.

An event camera is an imaging sensor that responds to local changes in intensity or brightness. Event cameras do not capture images using a shutter as conventional (frame) cameras do. Instead, each pixel inside an event camera operates independently and asynchronously, reporting changes in brightness as they occur and staying silent otherwise.

Each pixel of an event camera sensor stores a reference brightness level, and continuously compares it to the current brightness level. If the difference in brightness exceeds a threshold, that pixel resets its reference level and generates an event, e.g., a discrete packet that contains the pixel address and timestamp. Events may also contain the polarity (increase or decrease) of a brightness change, or an instantaneous measurement of the illumination level. Thus, event cameras output an asynchronous stream of events triggered by changes in scene illumination.

Since event cameras capture and deliver sparse information, they present several advantages for imagery such as increased power efficiency and reduced data bandwidth. Furthermore, since each pixel operates asynchronously, event-based sensors can capture and process movement without being restricted to a set frame rate, making these sensors ideal for tracking high-speed movement and a good choice for object tracking applications.

Event cameras are useful for motion detection and tracking applications because they only capture local changes in intensity, rather than capturing entire frames on a set interval. However, when presented with a highly dynamic background that produces orders of magnitude more changes in intensity than the objects of concern, this advantage rapidly diminishes as most of the computation is spent tracking and analyzing background movement. For example, when presented with the problem of detecting and tracking vessels in a maritime environment, unique challenges arise for event cameras. In particular, in a rough sea state the visible waves often produce many times more events than the vessels we are interested in tracking.

While it is understood that an event camera will capture less redundant information than a conventional frame-based camera, there is still more information than required for identifying and tracking objects. Gómez et al. also recognized this problem, but they reduce the amount of redundancy by randomly sampling a percentage of incoming events across the entire field of view, J. P. R. Gómez, A. G. Eguíluz, J. R. Martínez-de Dios and A. Ollero; "Asynchronous Event-Based Clustering and Tracking for Intrusion Monitoring in UAS", IEEE International Conference on Robotics and Automation (ICRA 2020), May 2020. It would appear that one short-coming of the Gómez, et al. approach is that randomly sampled entire fields of view may include redundancy in areas not of interest.

Stoffregen et al. appear to disclose an event-based approach to optical flow estimation and segmentation that can isolate objects and track their motion, see T. Stoffregen and L. Kleeman; "Simultaneous Optical Flow and Segmentation (SOFAS) using Dynamic Vision Sensor", arXiv: 1805.12326v1 [cs.CV], 31 May 2018. However, their implementation does not appear to run in real-time. Furthermore, the Stoffregen et al. approach collects events into groups based on flow vector rather than spatio-temporal proximity. Thus, the Stoffregen et al. approach increases the probability of unwanted grouping of objects of interest with a dynamic background that results in failure to successfully isolate objects.

Mitrokhin et al. present a deep learning approach to motion estimation from event data, see A. Mitrokhin, C. Fermüller, C. Parameshwara and Y. Aloimonos; "Event-Based Moving Object Detection and Tracking", arXiv: 1803.04523v3 [cs.CV], 12 Jan. 2020. However the Mitrokhin et al. approach requires GPU acceleration to run in real-time, significantly increasing the power consumption required.

Benosman et al. present an approach to motion detection using event-based optical flow estimation, see R. Benosman, S. H. Ieng, C. Clercq, C. Bartolozzi and M. Srinivasan; "Asynchronous Frameless Event-Based Optical Flow", Neural Networks 27 (2012), pp. 32-37, 2012. However, the Benosman et al. approach fails to isolate or identify different objects in the scene. Accordingly, these extra steps of isolating or identifying different objects in the scene must be performed as an additional step.

US Patent Application Publication No. US 2020/0265590 A1 to Daniilidis et al. appear to disclose prediction of an indication of motion using input from an event camera. However, the Daniilidis et al. approach employs a neural network and discretized event volumes and fails to include any motion analysis for detection or tracking.

For various motion tracking applications, including but not limited to, identification and motion tracking of sea vessels, distinguishing different objects is the primary goal. Accordingly, the prior art methods described above do not provide an ideal solution. For these reasons, there exists a need in the art for improved systems and methods for efficient filtering, clustering, tracking and persistent motion detection for event cameras.

SUMMARY OF THE INVENTION

An embodiment of a method for improving motion detection in an event camera having a sensor for generating events is disclosed. The embodiment of the method may include receiving the events from the sensor, wherein each event includes a position, (x, y) on the sensor and a timestamp, t. The method embodiment of the may further include partitioning each event sequentially in order of increasing timestamp, t, thereby generating partitioned events each associated with a particular partition in a grid of partitions according to the position, (x, y) on the sensor. The embodiment of the method may further include filtering each of the partitioned events within each of the particular partitions, wherein the filtering comprises noise filtering each of the partitioned events and allowing the partitioned events to pass the noise filtering as filtered events if concentrated in a predefined area within the particular partition. The embodiment of the method may further include buffering the filtered events in an event buffer to generate buffered events, the buffered events stored in a 3-dimensional array by the position, (x, y) on the sensor and the timestamp, t. The embodiment of the method may further include determining a pre-defined spatio-temporal neighborhood for each of the buffered events.

The embodiment of the method may further include clustering each of the buffered events in a cluster buffer by comparing a pre-defined spatio-temporal neighborhood for each of the buffered events with all other buffered events located within the pre-defined spatio-temporal neighborhood to obtain neighboring events relative to a given event under consideration. If none of the neighboring events belong to an existing cluster, then forming a new cluster to include the given event under consideration. Alternatively, if any one of the neighboring events belongs to an existing cluster, then assigning the given event to the existing cluster. The embodiment of the method may further include cluster sorting each of the clusters based on pre-selected parameters so that only those clusters that are likely to be associated with an object of interest are assigned as active clusters. The embodiment of the method may further include cluster tracking each of the active clusters by periodically sampling a centroid of each active cluster over time and determining direction results associated with each active cluster. The embodiment of the method may further include outputting the detection results associated with each active cluster.

An embodiment of a real time event-based detection and tracking system is disclosed. The embodiment of a real time event-based detection and tracking system may include an event camera having a sensor configured to generate events, each event having a position, (x, y) and timestamp, t. The embodiment of a real time event-based detection and tracking system may further include a motion tracking engine. This embodiment of a motion tracking engine may include data storage having an event buffer and a cluster buffer. This embodiment of a motion tracking engine may further include program storage. According to a particular embodiment, program storage may be configured to store a computer program, the computer program configured with instructions for implementing a method for detecting and tracking objects in motion. This embodiment of a motion tracking engine may further include a processor in communication with the event camera, the data storage and the program storage, the processor configured to execute the instructions in response to receiving the events from the event camera.

Additional features and advantages of the invention will be apparent from the detailed description which follows, taken in conjunction with the accompanying drawings, which together illustrate, by way of example, features of embodiments of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The following drawings illustrate exemplary embodiments for carrying out the invention. Like reference numerals refer to like parts in different views or embodiments of the present invention in the drawings.

DETAILED DESCRIPTION

Figure 1:
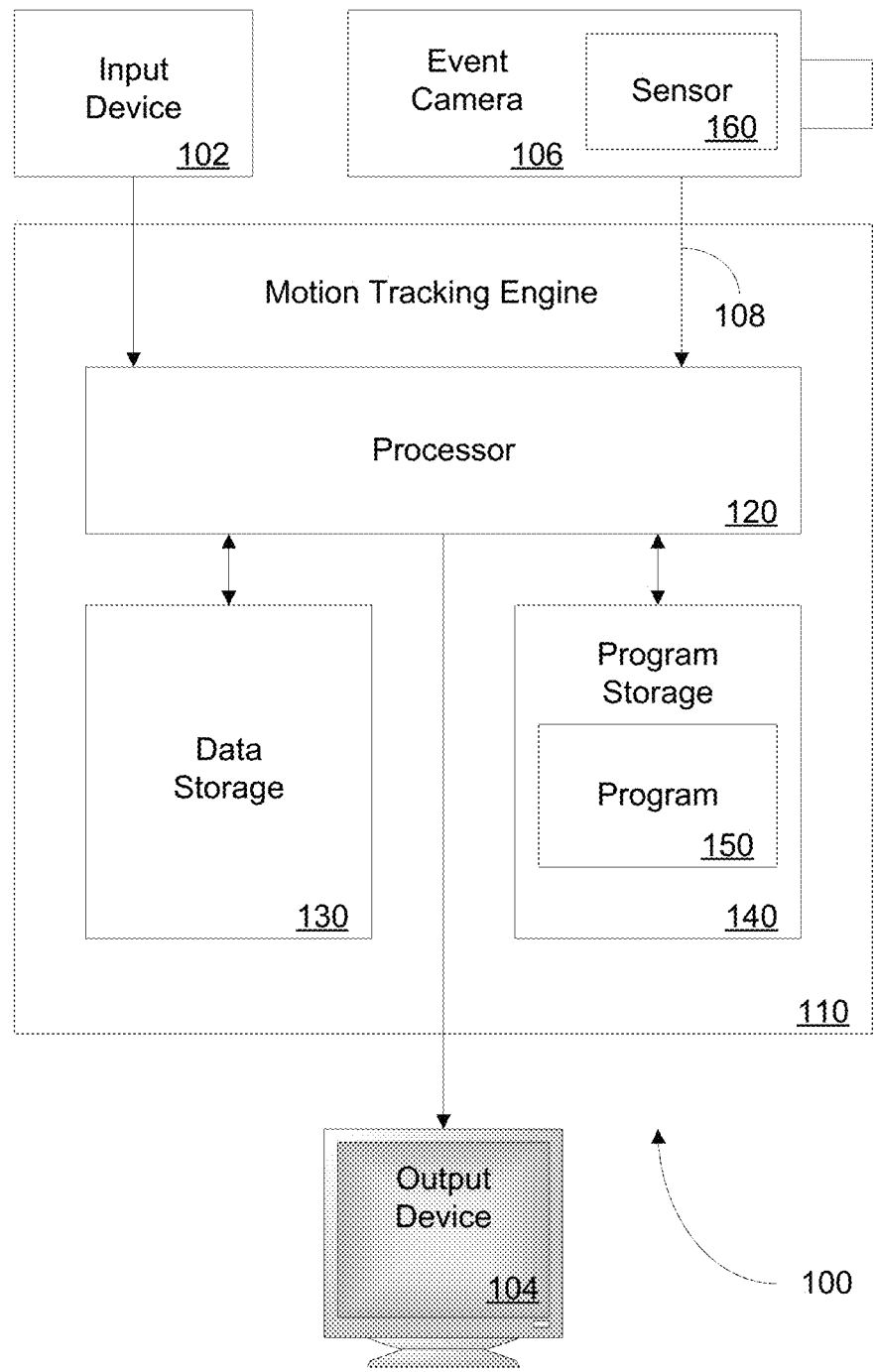
FIG. 1 is a block diagram of an embodiment of a motion detection system, according to the present invention.

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Embodiments of the present invention include a computationally efficient method by which data captured from an event camera is filtered, clustered, and analyzed to detect and track objects that move in a consistent fashion while ignoring events generated by random dynamic background motion. Embodiments of the present invention may further include event cameras and systems incorporating the method embodiments of the present invention. Embodiments of the present invention are useful for event camera applications that capture and generate events including those caused by dynamic background motion by filtering out such background motion and focusing processing power on objects of interest. The output results of the methods and systems disclosed herein may be exploited and/or disseminated to data visualization tools that allow users to efficiently detect and track objects of interest.

The various embodiments of the present invention solve the technical problem of providing computationally efficient methods and systems for identifying and tracking objects in motion when presented with a highly dynamic background that may produce orders of magnitude more changes in intensity than the objects of concern. The inventors have provided a novel and nonobvious technical solution to this problem. More particularly, embodiments of the present invention combine compatible asynchronous event filtering and clustering techniques in a computationally efficient way to identify and track objects in the field of view that exhibit persistent motion characteristic of marine vessels, cars, aircraft, and other vehicles while ignoring dynamic background elements that move in a more erratic fashion. While examples of the various embodiments of the present invention are illustrated in the context of tracking and identifying marine vessels, it will be understood that the teachings of the present invention may be employed in many other contexts and applications.

In contrast to the Gómez et al. approach, embodiments of the system and method of the present invention may be configured to divide the field of view into partitions. The system and method of the present invention may be configured to limit events processed in especially event-dense areas, while processing a higher percentage of events from isolated objects.

In contrast to the Mitrokhin et al. approach, embodiments the system and method of the present invention may be configured to run in real-time on any general-purpose CPU. According to further embodiments, the system and method of the present invention may be further accelerated with field-programmable gate array (FPGA) implementation due to its highly parallelized and localized nature.

In contrast to the approach disclosed in Benosman et al., embodiments of the system and method of the present invention distinguish between objects based on movement as a primary goal. Accordingly, the techniques discussed in Benosman et al. do not provide the ideal solution to the problem disclosed herein. Furthermore, the embodiments of the present invention distinguish over the Daniilidis et al. approach by employing parallel processing and motion analysis for detection or tracking of objects of interest. Having recited some of the novel and nonobvious features of the present invention, more specific embodiments will now be detailed with reference to the drawings.

FIG. 1 is a block diagram of an embodiment of a motion detection system shown generally at arrow 100, according to the present invention. Embodiments of system 100 may include various input devices 102 (only one shown in FIG. 1), e.g., keyboard, trackpad, joystick, trackball, or any other suitable computer input device for user input to interact and control system 100. Embodiments of system 100 may also include various output devices 104 (only one shown in FIG. 1), e.g., a computer monitor, printer, or any other suitable output device configured for displaying or recording outputs of system 100.

Embodiments of system 100 may also include an event camera 106 having a dynamic vision sensor, synonymously referred to herein simply as "sensor" 160 that may be configured to generate events 108 corresponding to motion detected in the field of view of the event camera 106. An exemplary event camera 106 suitable for use with the present invention is the Davis346 "Red" Camera, available from IniVation AG, Thurgauerstrasse 40,8050 Zurich, Switzerland. However, any suitable event camera that generates events having a corresponding position, (x, y), timestamp, t, may be used in the system 100 embodiment of the present invention. It will be understood that event cameras and dynamic vision sensors are well-known to those of ordinary skill in the art, and thus, will not be further elaborated herein.

Embodiments of system 100 may also include a motion tracking engine 110 in communication with input device 102, output device 104 and event camera 106 having a sensor 160. Embodiments of a motion tracking engine 110 may include a processor 120 in communication with data storage 130 and program storage 140. Embodiments of processor 120 may be for example and not by way of limitation a general-purpose computer processing unit (CPU), field programmable gate array (FPGA), multicore processor, application specific integrated circuit (ASIC), custom integrated circuit or any other suitable hardware for processing the computer program instructions and data of the present invention. Embodiments of data storage 130 and program storage 140 may be any suitable computer data storage devices, e.g., hard disk drives, solid state drives, removable media drives, optical drives, or any other suitable computer data storage device consistent with the teachings of the present invention. It will be understood that processors, data storage and program storage devices are well-known to those of ordinary skill in the art and thus will not be further elaborated herein.

Embodiments of system 100 may be designed to work well with low-resolution event cameras having smaller sensor fields generating fewer events rather than leading event-camera based object trackers. For example and not by way of limitation, the embodiments of system 100 disclosed herein work well with an event camera 106 (FIG. 1) such as the Davis346 "Red" Camera, which has a resolution of only 346×260 pixels. The partitioning feature of the present invention, described in greater detail herein, is specifically designed to support multiprocessing, wherein each partition can be operated independently and scheduled on multiple processor cores, or any other suitable parallel computation techniques known to those of skill in the art. The way each partition is configured to saturate via filtering (i.e., rejects further events after a certain number has been collected) is designed as such to prevent the processor(s) from becoming overburdened by a surge in events and slowing operation. This is a major problem in event cameras as they produce a fluctuating data stream, usually leading to lag or leaving the majority of the processor idle. The invention is designed to maximize the use of available processing power while maintaining effective real-time operation.

Figure 2:
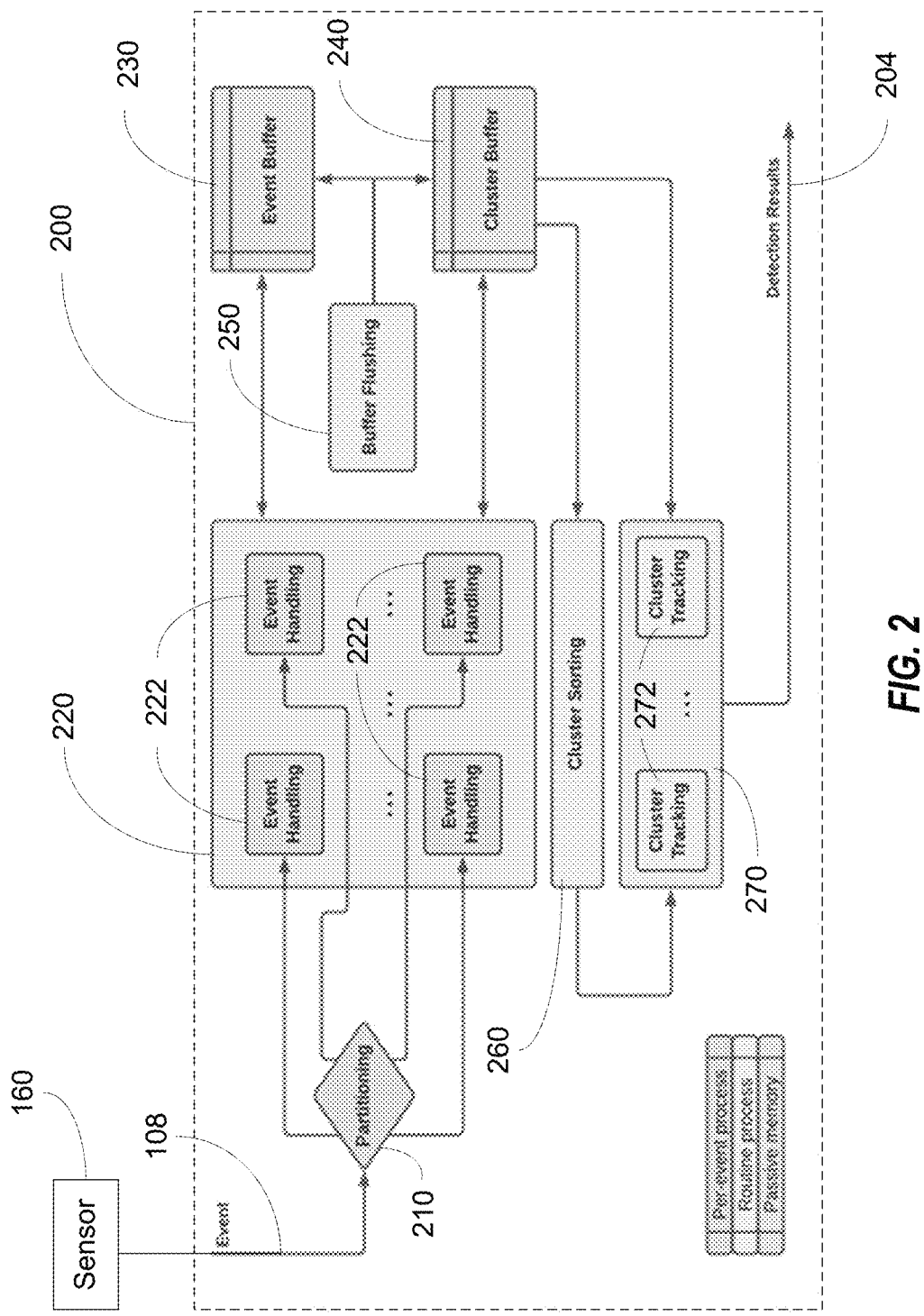
FIG. 2 is a flowchart of an embodiment of a process for manipulating image sensor data used for motion detection in event cameras, according to the present invention.

Embodiments of processor 120 may be multiple distinct processing units (as in the case of an FPGA implementation), or operate with multiple independent processor cores, with each processing unit or core designated to handle events from a given partition in parallel using independent event handling instances 222 (FIG. 2). In one particular embodiment, 16 event handling instances 222 may be time-shared among 8 cores using scheduling provided by the operating system. An alternative embodiment of system 200 may be operated on a processor 120 which may be a single monolithic processor, multiple processors or processor cores according to the present invention.

Referring again to FIG. 1, embodiments of system 100 may also include program 150 which may be stored on program storage 140. Program 150 may include computer-executable (machine language) or human-readable (high-level) instructions for implementing embodiments of the methods or processes disclosed herein for efficient filtering, clustering, tracking and persistent motion detection for event cameras as disclosed herein. It will be understood that any particular high-level human-readable computer language (code) and/or programming environment may be used to implement program 150, e.g., Python, C++, etc., consistent with the teachings of the present invention. It will be further understood that any suitable compilers, interpreters, translators and/or assemblers may be used for converting high-level code to computer-executable (machine language) instructions according to the present invention and are well-known to those of ordinary skill in the art and thus will not be further elaborated herein.

System 100 may be configured to operate asynchronously and concurrently to the maximum extent possible, with a fixed amount of memory and processing demand. Having described a system level embodiment of a motion detection system 100, the following description details particular embodiments of methods and processes which may be implemented as an embodiment of program 150 in system 100.

Referring now to FIG. 2, a flowchart of an embodiment of a process (indicated at dashed box 200) for efficient filtering, clustering, tracking and persistent motion detection for event cameras is disclosed, according to the present invention. The terms "method" and "process" are used interchangeably herein. Each feature and process step shown in FIG. 2 is described and explained thoroughly in the following detailed descriptions with reference to the drawing FIGS.

According to a particular embodiment, process 200 receives input in the form of "on" or "off" events 108 provided by an event camera 106 capturing discrete events 108 using sensor 160. Each event 108 read from the event camera 106 may generally include a corresponding position, (x, y) on the sensor 160, timestamp, t, and polarity, p. For the purposes of the present invention, polarity information is unneeded. According to the present invention, timestamp, t, and position, (x, y) may be passed to the partitioning module 210. This type of input may also be referred to as "address event representation" or (AER). According to the illustrated embodiment shown in FIG. 1, events 108 are configured to be input to process 200 in a sequential fashion, in order of increasing timestamp, t. The illustrated embodiment of process 200 may be divided into seven main modules, two of which are instanced, as indicated in FIG. 2 by ellipses to represent a variable number of instances. All modules may be configured to operate concurrently, synchronizing as necessary to perform data transfer depicted by arrows. Process 200 outputs detection results 204 featuring data for each tracked cluster, which may include center of mass (centroid), bounding box coordinates, optical flow vectors, and persistence of motion.

Process 200 Overview: Each of the seven modules executes on either a per-event basis (in green), periodically (in yellow), or when data is requested/provided by another module (in blue). A particularly useful feature of the present invention is the use of partitioning in the sensor 160 field of view. By dividing the field of view into partitions, embodiments of process 200 may be configured to limit events processed in especially event-dense areas while still processing a high percentage of events from isolated objects.

Each partition-directed event is passed from the partitioning module 210 to the event handling module 220. More particularly, each partition-directed event is sent to an event handling instance 222 (four shown in FIG. 2) responsible for the partition in which it is received, according to the value of (x, y). It will be understood that field of view from the event camera 106 and its associated sensor 160 may be divided into any suitable number of partitions and associated event handling instances 222 (note the ellipses in event handling module 220, FIG. 2) according to various embodiments of the present invention. The event handling module 220 is where each event handling instance 222 independently processes events at a constant rate.

The event handling module 220 may also be in communication with the event buffer 230. This particular embodiment of an event buffer 230 stores a fixed number of the most recent events received by location. The event handling module 220 is also in communication with the cluster buffer 240. This particular embodiment of a cluster buffer stores data pertaining to each cluster of events as explained below. The embodiment of process 200 may further include a buffer flushing module 250 in communication with event buffer 230 and cluster buffer 240. This embodiment of a buffer flushing module 250 is configured to periodically remove expired events from the event buffer 230 and cluster buffer 240. The embodiment of process 200 may further include a cluster sorting module 260 in communication with the cluster buffer module 240. This embodiment of a cluster sorting module 260 may be configured to calculate the priority of each cluster using data retrieved from cluster buffer module 240. The embodiment of process 200 may further include a cluster tracking module 270 with its one or more cluster tracking instances 272 in communication with the cluster sorting module 260. This embodiment of a cluster sorting module 260 may be configured to track cluster movement in order to evaluate object significance and produce detection results 204. The following descriptions provide additional detail regarding each of the modules 210, 220 230, 240, 250, 260 and 270 in turn.

Partitioning Module 210: Events from sensor 160 may be divided into a preselected grid of partitions, according to the needs of the user. According to a general embodiment of process 200, the image field from sensor 160 may be divided into m×n partitions, where n is the number of vertical divisions and m is the number of horizontal divisions. More particularly, an embodiment of process 200 may include a partitioning module 210 configured to direct events 108 according to a pre-determined partitioning of the field of view of the sensor 160. The embodiment of a partitioning module 210 performs event partitioning according to event location (x, y), thereby directing each partition-directed event to the appropriate partition within the field of view for further processing.

Each partition corresponds to a single event handling instance 222 within the event handling module 220. According to various embodiments of the present invention, more partitions allow for more events to be processed in parallel if the system 100 (FIG. 1) is implemented on hardware with parallel processing capabilities, for example and not by way of limitation, a multicore processor, FPGA, ASIC, custom integrated circuit, or any other suitable computer hardware configured for parallel processing. Each incoming event 108 (FIG. 2) will be processed only by the event handling instance 222 responsible for the partition in which it lands.

Figure 3:
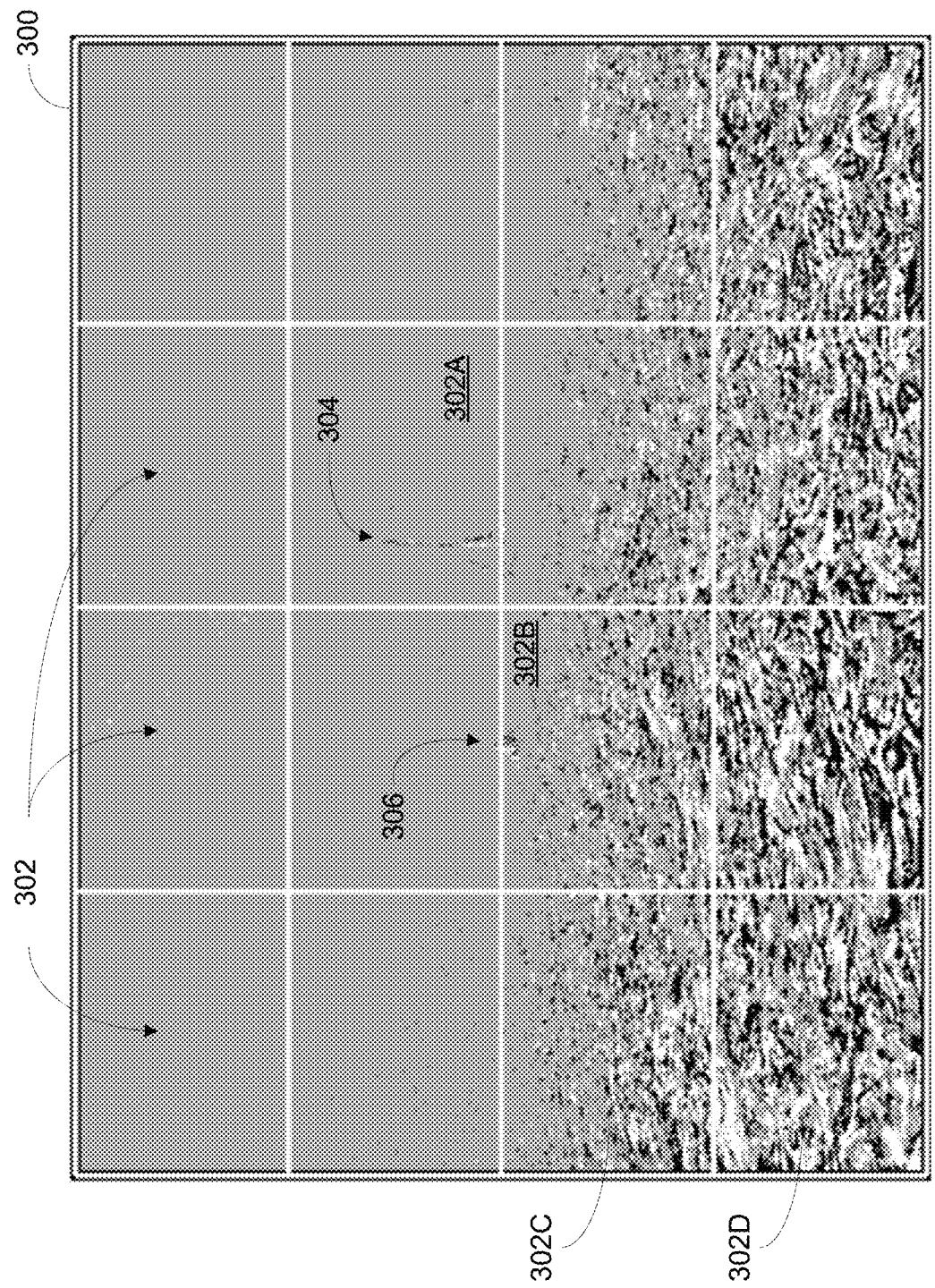
FIG. 3 is an image of raw event data from an event camera with partitions, according to an embodiment of the present invention.

FIG. 3 illustrates an image of raw event data from an event camera 106 (FIG. 1) with partitions overlaid, according to the present invention. This raw event data is an example of the output of a sensor 160 (FIG. 2) from an event camera 106 (FIG. 1). More particularly FIG. 3 illustrates an exemplary partition of the field of view 300 of the raw event data from an event camera 106 sensing events generated by sensor 160 from a seascape. Still more particularly, FIG. 3 will be used to explain how raw event input can be processed to capture objects of interest while limiting the computation spent processing irrelevant background motion.

In the example shown in FIG. 3, the partitioning module 210 may be configured to partition the field of view 300 from the sensor 160 into four (4) horizontal divisions and four (4) vertical divisions, resulting in sixteen (16) partitions 302. In the example shown in FIG. 3, partition 302A only contains events produced by an object of interest, in this case the top part of a sailboat 304. Portions of the object of interest may also fall within other partitions depending on the particular object. Most of the events produced by this sailboat 304 object of interest are configured to be handled with the limited rate of a single event handling instance 222.

The example shown in FIG. 3 also illustrates partitions, e.g., 302C and 302D that contain many events, but none produced by an object of interest (just waves). A particularly useful feature of process 200 is that by knowing that there is no object of interest in such partitions 302C and 302D, there is no need to process every event in such partitions 302C and 302D to come to this conclusion. With this knowledge, process 200 may be configured to limit the event rate in such partitions 302C and 302D and thereby save significant computation and increase motion detection efficiency for event cameras 106.

The example shown in FIG. 3 further illustrates an exemplary partition 302B that contains an object of interest, in this case a motorboat 306, but also contains many events produced by waves that are not of interest. With this knowledge, process 200 may be configured to limit the event rate such that enough of the events get through to identify the object of interest, motorboat 306, while ignoring enough events to keep the object separate from the waves.

Event Handling Module 220: Each event handling instance 222 processes events received from the partitioning module 210 at a limited rate, according to the present invention. This rate may be tuned so that if the events that fall within its partition are concentrated in a small area, they will easily pass through temporal and noise filtering and be clustered together. However, if the events in a given partition 302 are more evenly spread out, they will be limited to the extent that only small and short-lived clusters will be able to form. The temporal and noise filtering stage of each event handling instance 222 also ensures that the system 200 will not be overwhelmed by surges in event activity, since event cameras 106 capture data at a highly variable rate.

According to a particular embodiment of the event handling module 220, each event may first be passed through a temporal filter. Each event handling instance 222 may be configured with a predetermined time per event, $T_e$, allocated for processing, such that if another event arrives while an event is currently being processed, the incoming event will be ignored and discarded. This allows the rate of events processed to be strictly limited to reduce processing demand.

Each event handling instance 222 may further include a temporal filter to ignore "hot pixels," or locations on sensor 160 that produce spurious events at a high rate. This embodiment of a temporal filter holds each location for a set time window and rejects any events that occur within that time window. The time window may be configured such that a single hot pixel will not be able to pass events with enough frequency to pass through the subsequent noise filter without having events in at least one neighboring location. The temporal filter operates by reading the event buffer 230 at position (x, y) to obtain the timestamp, t, of the most recent buffered event at that location. If the timestamp, t, is within the predetermined time per event $T_e$ window, then the incoming event will be discarded. Otherwise, the event is passed to the noise filter.

According to embodiments of the present invention, noise filtering takes each new event and considers the number of events in its spatio-temporal neighborhood in the shared event buffer 230 and filters it out if the number of neighbors is not above a specified count. This noise filtering process step serves to limit the amount of processing devoted to subsequent clustering and limits the total number of clusters generated, since lone events would be assigned to new clusters if they were not filtered out at this stage.

More particularly, the noise filter counts the buffered events in the spatio-temporal neighborhood. The spatio-temporal neighborhood consists of all buffered events from pixels immediately adjacent to (x, y) and occurring within a certain time, the filter threshold, $T_f$, of t. Events that fall within the filter threshold, $T_f$, of t are counted, producing $n_e$, the number of adjacent events.

According to a particular embodiment of process 200, clustering takes each event that passes the noise filter and considers the clusters assigned to events in its spatio-temporal neighborhood in the event buffer module 230. If none of the neighboring events have suitable assigned clusters, then a new cluster will be created. If an event is adjacent to events belonging to multiple clusters, it will be assigned to one of them, depending on various parameters, for example and not by way of limitation, the time that each cluster was generated, proximity of the event to each cluster centroid, or other information about the clusters. More particularly, the set of adjacent clusters, A, is assembled from clusters assigned to neighboring events within the clustering threshold, $T_c$, of t. Consideration of events in the event buffer for clustering is made based on comparing the number of adjacent events, $n_e$, to a pre-selected clustering count threshold, $n_c$. If $n_e$ exceeds $n_c$, the event passes the noise filter and may be considered for clustering. This last condition ensures that the events which are considered for clustering have temporal persistence, thereby acting as a temporal filter. In a particular embodiment of process 200, $n_c=4$, i.e., if $n_e>4$, then the event passes the noise filter and will be considered for clustering.

Figure 4:
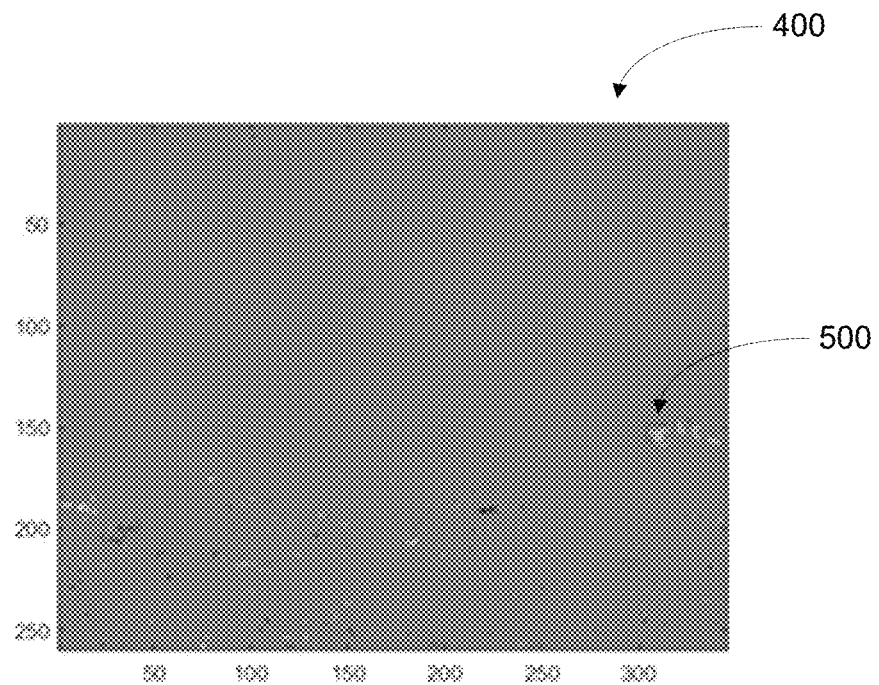
FIG. 4 is a color image illustrating the state of an embodiment of an event buffer at a given point in time, according to the present invention.
Figure 5:
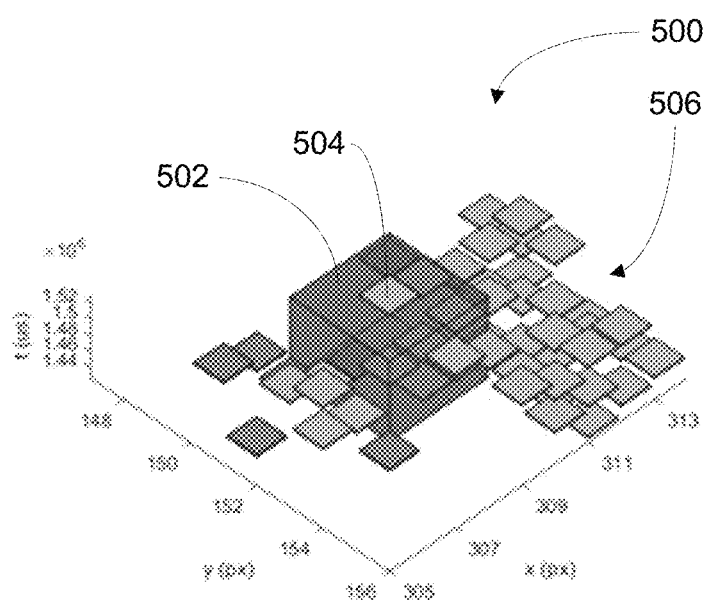
FIG. 5 is a color graphic illustrating a 3D view of a small section of the event buffer shown in FIG. 4, according to the present invention.

To assign the particular event to an appropriate cluster, first the adjacent clusters A are sorted by age. The event will be assigned to the oldest adjacent cluster whose centroid is within d pixels of (x, y) by Manhattan distance. If there are no adjacent clusters with centroids within range, then a new cluster will be created consisting of only that particular event. FIGS. 4 and 5 and related discussion below provide exemplary event processing according to process 200.

FIG. 4 is a color image illustrating the state 400 of an embodiment of an event buffer 230 at a given point in time, according to the present invention. More particularly, FIG. 4 illustrates a top-down view of the (x, y) locations of events assigned to clusters, with each cluster drawn in a different color. FIG. 5 is a color graphic illustrating a 3-dimensional (3D) view of a small section 500 of the event buffer 230 shown in FIG. 4, more particularly, the (red square) near the edge of the bright green cluster, according to the present invention.

As shown in FIG. 5, the red cube 502 represents the spatio-temporal neighborhood of the incoming event 504 (top green square) on top of the cube 502. Each event is represented graphically as a square located at a particular temporal plane (z-axis) and spatial location (x, y). The red cube encapsulates those events (each layered square within the red cube 502) that will be counted for filtering and which clusters will be considered for clustering. In this example there are six events inside the cube, and one adjacent cluster (bright green). So, the incoming event 504 will pass the filter and be assigned to the bright green cluster, shown generally at arrow 506 represented graphically by the bright green events that are generally adjacent to one another spatially and/or temporally.

Event Buffer Module 230: As shown in FIG. 5, event buffer 230 stores events in a 3D array by timestamp (z-direction or layer) and location (x, y), along with assigned cluster if applicable (in FIG. 5, the grouping of bright green events that make up cluster 506). A limited number of events are stored for each location (x, y). So, the event buffer 230 occupies a fixed size. If the maximum number of events is reached for a given location, the oldest event may be replaced by the new event, according to the present invention. This provides a location-based map of the events belonging to each cluster, so that the buffer can be queried for the neighborhood of each incoming event in constant time.

Cluster Buffer Module 240: Referring again to FIG. 2, the cluster buffer 240 may be configured to store cluster data in a hash table, with every distinct cluster having a randomly generated unique identifier that is used as its key, according to a particular embodiment of the present invention. For each cluster, the cluster buffer 240 stores "weight", or the total number of events belonging to the cluster; "birth time", or the timestamp of the first event assigned to that cluster; and the sum of x and y positions of all events in the cluster, so that its centroid can be calculated in constant time by dividing these sums by the cluster weight. When events are added to or removed from the event buffer 230, the corresponding cluster in the cluster buffer 240 is updated, accordingly.

Buffer Flushing Module 250: According to a particular embodiment of process 200, the event buffer 230 is periodically "flushed", and all stored events that are too old to be considered by the correlational filter or the clustering process are removed, and the cluster buffer 240 is updated. According to a specific embodiment of process 200, events older than both pre-selected temporal threshold, $\tau_t$, and a preselected clustering threshold, $\tau_c$, are periodically flushed from the event buffer 230, and the affected clusters in the cluster buffer 240 are updated. This process step maintains the currency of each cluster and allows the movement of their centroids to reflect the actual movement of the object being tracked.

Cluster Sorting Module 260: When necessary, all active clusters in the cluster buffer 240 are sorted so that the next available cluster tracking instance 272 may be assigned to a cluster that is more likely to belong to an object of interest. According to a particular embodiment of process 200, all clusters in the cluster buffer 240 are periodically sorted by the number of buffered events belonging to each cluster. Clusters with a higher number of events are ranked higher. Clusters with zero events are considered inactive and ineligible for tracking. It will be understood that any number of cluster tracking instances 272 may be active at any given time based on the clusters being tracked at that time, hence the ellipses shown in FIG. 2 for cluster tracking module 270.

Cluster Tracking Module 270: Periodically, each cluster tracking instance 272 in the cluster tracking module 270 will sample the centroid of the cluster that it is tracking to evaluate the movement of that cluster over time. If a tracked cluster has its last events flushed from the buffer, then the cluster tracking instance 272 will assign itself to the highest priority untracked cluster as determined by the cluster sorting module 260. The movement of the cluster centroid for a limited window into the past is then analyzed, and if the cluster exhibits characteristics of persistent motion greater than a threshold of 0.50, then it is marked as a positive detection.

According to a particular embodiment of process 200, each cluster tracking instance 272 within the cluster tracking module 270 may be assigned a cluster of decreasing priority (rank) as determined by the cluster sorting module 260. Once a particular cluster is assigned to a given cluster tracking instance 272, that particular cluster will be tracked until its size has reached zero. While each cluster is being tracked, its centroid position may also be recorded periodically. According to a particular embodiment, samples may be retained for $T_v$ microseconds. To calculate v, or the long-term velocity, the oldest centroid position $c_v$ is compared with the current centroid position c and divided by $T_v$ as shown in Eq. 1, below. Similarly, the short-term velocity u is calculated using $c_u$, a recorded centroid position $T_u$ microseconds in the past, as shown in Eq. 2, below.

$$v = \frac{c - c_v}{T_v} \quad \text{(Eq. 1)}$$

$$u = \frac{c - c_u}{T_u} \quad \text{(Eq. 2)}$$

In order to characterize the motion of each tracked cluster, the long-term and short-term velocities v and u may be periodically compared using two distinct ratios configured to add to, or subtract from, a persistent stability score s. On every time step, s may be increased by the difference ratio r, calculated in Eq. 3. Eq. 3 places the difference between the two in the denominator so that as the difference between v and u decreases, the value of r increases. ε is set to a small value to prevent division by zero in the event that v=u. This causes the stability s to increase sharply for clusters that hold a steady velocity for even a short amount of time, while still allowing it to accumulate for objects that hold a nearly steady velocity over a longer period of time.

$$r = \frac{|v|}{|v - u| + \varepsilon} \quad \text{(Eq. 3)}$$

To mitigate the constant increase of stability over time, we also subtract a constant multiple of the angle ratio, $r_a$, which uses the dot product between v and u to produce a dissimilarity measure, as shown in Eq. 4. Unlike r which can grow quite large, $r_a$ is normalized so that it ranges from 0 (when u=v) to 1 (when u=−v).

$$r_a = \frac{1}{2}\left(1 - \frac{v \cdot u}{\sqrt{|v|^2 \cdot |u|^2}}\right) \quad \text{(Eq. 4)}$$

At every time step, a multiple $c_a r_a$ is subtracted from s, where $c_a$ is the scaling factor that represents the decrease in s when u and v are anti-parallel. The combined change in s each time step is shown in Eq. 5, where i is the number of time steps over which a given cluster has been tracked.

$$s_i = \begin{cases} s_i + r - c_a r_a & i > 0 \\ 0 & i = 0 \end{cases} \quad \text{(Eq. 5)}$$

Finally, for each detection a confidence score, w, may be produced from s using an exponential function as shown in Eq. 6. The confidence w ranges from 0 to 1 and is therefore suitable for use with standard computer vision metrics such as a receiver-operator curve. Over time, the confidence value tends to go to 1 for clusters exhibiting consistent stable motion, and tends to go negative (effectively 0) for clusters exhibiting erratic motion.

$$w = 1 - e^{-s} \quad \text{(Eq. 6)}$$

Exemplary embodiments of process 200 have been implemented by the inventors in a system 200 with software implemented in both Python and C++ languages using suitable computer hardware to demonstrate the improved performance of specialized event cameras 106 achieved by the present invention. Results from a particular embodiment of process 200 on data captured by an event camera 108 are detailed below with reference to FIGS. 6 and 7.

Figure 6:
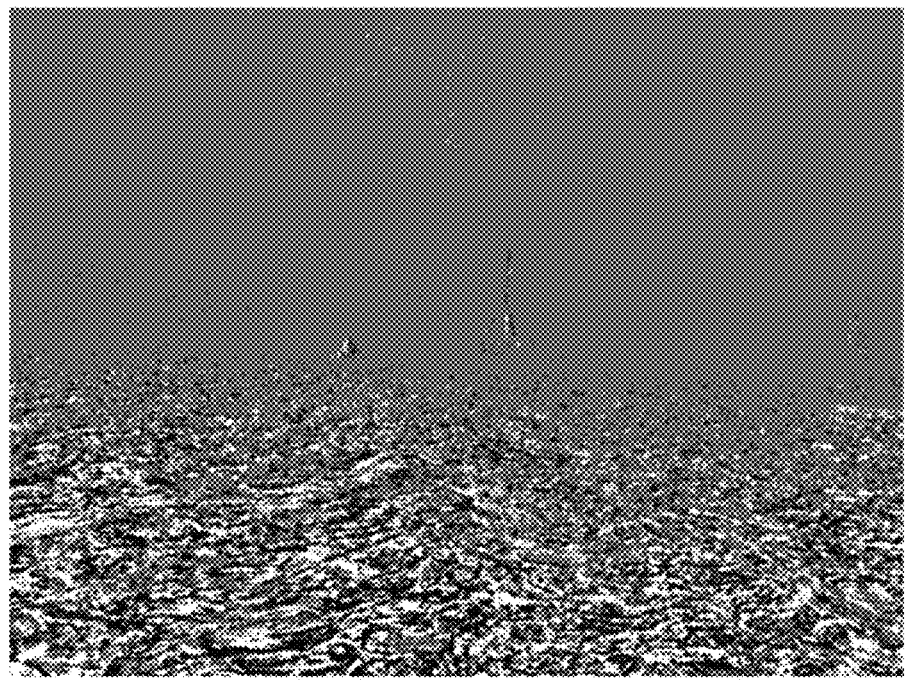
FIG. 6 illustrates the same black and white image of raw event data illustrated in FIG. 3 without partitioning, according to the present invention.
Figure 7:
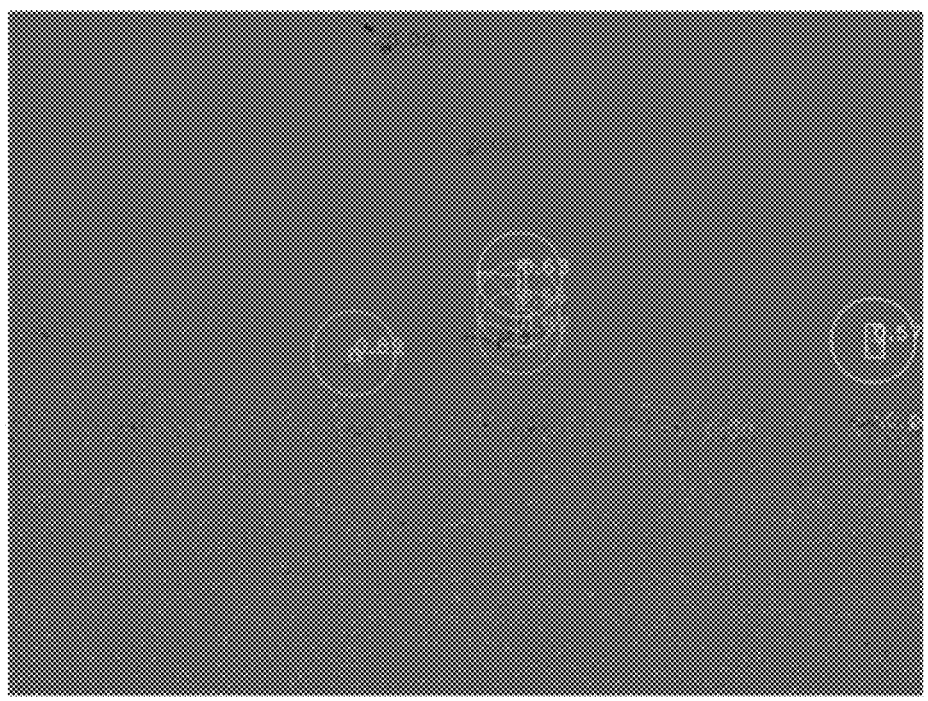
FIG. 7 is a color graphic illustration of the raw event data of FIG. 6 after processing, according to the present invention.

FIG. 6 illustrates the same black and white image of raw event data 600 illustrated in FIG. 3 without partitioning, according to the present invention. The events illustrated in FIG. 6 are pixels representing movement captured over a 30 ms period shown in black and white on a grey background. FIG. 7 is a color graphic illustration of the raw event data of FIG. 6 after processing, i.e., processed event data 700, according to the present invention.

More particularly, FIG. 7 illustrates filtered events shown in greyscale, with circled clusters (six shown in FIG. 7) representing objects of concern in color. According to the illustrated embodiment, a different color is used for each cluster, circled or not. Arrows emanating from the center of each the circled clusters represent optical flow estimation and numbers represent persistence of motion over time on a scale from 0.00 to 1.00. According to a particular embodiment, objects that are circled have persistence of motion calculated to be over 0.50, which is the threshold set to consider them to be objects of interest. It will be understood that any suitable persistence of motion threshold could be used consistent with the teachings of the present invention.

As noted earlier, the outputs or detection results 204 (FIG. 2) from embodiments the system 100 and process 200 are configured to be used by data visualization tools, that allow a user to visually peruse the objects of interest in the field of view of an event camera 106 (FIG. 1). For each cluster here are three main output parameters that make up the detection results 204, according to a particular embodiment of the present invention. These parameters are the long-term velocity (v), the short-term velocity (u) and confidence score (w). Each of these output parameters may then be then overlaid on the image field to display both spurious (e.g., waves/noise) and slow-traversing events (targets of interest) that are in close proximity to the same spatio-temporal neighborhood. By providing all this information to a user (or an analyst) such a user may then review same and make determinations regarding which clusters are important.

Further embodiments of the system 100 and process 200 may be configured to selectively remove the events/clusters having low confidence by using a threshold to remove low-confidence clusters from the display or output device 104 (FIG. 1) presented to the user. So that the only events displayed to the user on a visualization tool are those events or clusters that the user is interested in, or for which a high confidence score was associated. According to another embodiment, such a threshold may also be input to an alert system or image classifier that is only spun up when the confidence score (w) exceeds a specific value.

Embodiments of the present invention may be configured as edge-computing applications designed to be implemented on energy-efficient hardware due to its modularity, aggressive filtering, and use of event camera input. Embodiments of the present invention may further be configured for use in tandem with more costly conventional image tracking and classification systems that require greater processing power, but no longer need to be running constantly to maintain surveillance.

Having described particular system and process embodiments of the present invention with reference to the drawing FIGS. that solve the technical problem described herein, some generic embodiments of the present invention will be described, below.

An embodiment of a method for improving motion detection in an event camera having a sensor for generating events is disclosed. The embodiment of the method may include receiving the events from the sensor, wherein each event includes a position, (x, y) on the sensor and a timestamp, t. The method embodiment of the may further include partitioning each event sequentially in order of increasing timestamp, t, thereby generating partitioned events each associated with a particular partition in a grid of partitions according to the position, (x, y) on the sensor. The embodiment of the method may further include filtering each of the partitioned events within each of the particular partitions, wherein the filtering comprises noise filtering each of the partitioned events and allowing the partitioned events to pass the noise filtering as filtered events if concentrated in a predefined area within the particular partition. The embodiment of the method may further include buffering the filtered events in an event buffer to generate buffered events, the buffered events stored in a 3-dimensional array by the position, (x, y) on the sensor and the timestamp, t. The embodiment of the method may further include determining a pre-defined spatio-temporal neighborhood for each of the buffered events.

The embodiment of the method may further include clustering each of the buffered events in a cluster buffer by comparing a pre-defined spatio-temporal neighborhood for each of the buffered events with all other buffered events located within the pre-defined spatio-temporal neighborhood to obtain neighboring events relative to a given event under consideration. If none of the neighboring events belong to an existing cluster, then forming a new cluster to include the given event under consideration. Alternatively, if any one of the neighboring events belongs to an existing cluster, then assigning the given event to the existing cluster. The embodiment of the method may further include cluster sorting each of the clusters based on pre-selected parameters so that only those clusters that are likely to be associated with an object of interest are assigned as active clusters. The embodiment of the method may further include cluster tracking each of the active clusters by periodically sampling a centroid of each active cluster over time and determining direction results associated with each active cluster. The embodiment of the method may further include outputting the detection results associated with each active cluster.

According to another embodiment of the method for improving motion detection in an event camera having a sensor for generating events, the filtering may further include temporally filtering each of the partitioned events by holding each event position, (x, y) for a pre-selected temporal threshold, $\tau_t$, and rejecting any subsequent events that occur within the pre-selected temporal threshold, $\tau_t$, at the held position, (x, y). According to still another embodiment of the method for improving motion detection in an event camera having a sensor for generating events, filtering may further include temporally filtering each particular event of the partitioned events. According to this embodiment, the temporally filtering may further include reading a top of the event buffer at the (x, y) location of the particular event to obtain a timestamp, t, of a most recent buffered event at the (x, y) location. If the timestamp, t, is within a pre-selected temporal threshold, $\tau_t$, then the particular event may be discarded. If the timestamp, t, is outside the pre-selected temporal threshold, $\tau_t$, then the particular event may be passed to the noise filtering.

According to yet another embodiment of the method for improving motion detection in an event camera having a sensor for generating events, the filtering may further include pre-filtering each particular event of the partitioned events. According to this embodiment, the pre-filtering may include establishing a set time per event, $\tau_e$, allocated for processing the particular event received by an event handling instance associated with a partition. If a subsequent event of the partitioned events arrives at the event handling instance associated with the partition while the particular event is still processing, the subsequent event may be ignored and discarded.

According to still yet another embodiment of the method for improving motion detection in an event camera having a sensor for generating events, buffering the filtered events may further include for each incoming filtered event, establishing a spatio-temporal neighborhood consisting of all buffered events from pixels immediately adjacent to an (x, y) location of the incoming filtered event and occurring within a pre-established filter time threshold, $\tau_f$, of t, the timestamp of the incoming filtered event. According to this embodiment, the method may include counting a number of adjacent events, $n_e$, falling within the spatio-temporal neighborhood. According to this embodiment, the method may include assembling a set of adjacent clusters, A, from clusters assigned to neighboring events within a clustering threshold, $\tau_c$, of the timestamp, t, of the incoming filtered event. If $n_e > n_c$, where $n_c$ is a pre-selected clustering count threshold, then the incoming filtered event may be stored as a buffered event and considered for clustering. According to a particular embodiment of the method for improving motion detection in an event camera having a sensor for generating events, $n_c = 4$.

According to still yet another embodiment, the method for improving motion detection in an event camera having a sensor for generating events may further include buffer flushing. According to this embodiment, buffer flushing may include periodically flushing any events stored in the event buffer that are older than both $\tau_f$ and $\tau_c$. According to this embodiment, buffer flushing may further include updating any affected clusters in the cluster buffer.

According to one embodiment of the method for improving motion detection in an event camera having a sensor for generating events, cluster sorting may further include periodically sorting all clusters in the cluster buffer by total number of buffered events belonging to each cluster. According to this embodiment, cluster sorting may further include ranking each cluster by the number of buffered events belonging to each cluster.

According to another embodiment of the method for improving motion detection in an event camera having a sensor for generating events, cluster tracking may further include assigning a cluster of decreasing rank to a cluster tracking instance for tracking until its rank reaches zero. According to this embodiment, cluster tracking may further include periodically recording cluster centroid position over a long-term window of time, $T_v$. According to this embodiment, cluster tracking may further include calculating long-term velocity, v, by comparing an oldest centroid position, $c_v$, with a current centroid position, c, and dividing by $T_v$.

According to yet another embodiment of the method for improving motion detection in an event camera having a sensor for generating events, cluster tracking may further include assigning a cluster of decreasing rank to a cluster tracking instance for tracking until its rank reaches zero. According to this embodiment, cluster tracking may further include periodically recording cluster centroid position over a short-term window of time, $T_u$. According to this embodiment, cluster tracking may further include calculating short-term velocity, u, by comparing an oldest centroid position, $c_u$, with a current centroid position, c, and dividing by $T_u$. According to still another embodiment of the method for improving motion detection in an event camera having a sensor for generating events, the method may be configured to track and identify marine vessels on water surface.

An embodiment of a real time event-based detection and tracking system is disclosed. The embodiment of a real time event-based detection and tracking system may include an event camera having a sensor configured to generate events, each event having a position, (x, y) and timestamp, t. The embodiment of a real time event-based detection and tracking system may further include a motion tracking engine. This embodiment of a motion tracking engine may include data storage having an event buffer and a cluster buffer. This embodiment of a motion tracking engine may further include program storage. According to a particular embodiment, program storage may be configured to store a computer program, the computer program configured with instructions for implementing a method for detecting and tracking objects in motion. Embodiments of the method may include the embodiments of generic methods for improving motion detection in an event camera having a sensor for generating events described herein. Embodiments of the method may also include process 200, as described herein. This embodiment of a motion tracking engine may further include a processor in communication with the event camera, the data storage and the program storage, the processor configured to execute the instructions in response to receiving the events from the event camera. According to still another embodiment, system may be configured to track and identify marine vessels on water surface. According to still other embodiments, the processor may be a single monolithic processor, multiple monolithic processors, or multiple processor cores.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

From the above description of the system and method for efficient filtering, clustering, tracking and persistent motion detection for event cameras, it is manifest that various techniques may be used for implementing the concepts of system 100, process 200 and their variants without departing from the scope of the claims. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A method for improving motion detection in an event camera having a sensor for generating events, the method comprising:
receiving the events from the sensor, wherein each event includes a position, (x, y) on the sensor and a timestamp, t;
partitioning each event sequentially in order of increasing timestamp, t, thereby generating partitioned events each associated with a particular partition in a grid of partitions according to the position, (x, y) on the sensor;
filtering each of the partitioned events within each of the particular partitions, wherein the filtering comprises noise filtering each of the partitioned events and allowing the partitioned events to pass the noise filtering as filtered events if concentrated in a predefined area within the particular partition;
buffering the filtered events in an event buffer to generate buffered events, the buffered events stored in a 3-dimensional array by the position, (x, y) on the sensor and the timestamp, t;
determining a pre-defined spatio-temporal neighborhood for each of the buffered events;
clustering each of the buffered events in a cluster buffer by comparing a pre-defined spatio-temporal neighborhood for each of the buffered events with all other buffered events located within the pre-defined spatio-temporal neighborhood to obtain neighboring events relative to a given event under consideration:
if none of the neighboring events belong to an existing cluster, then forming a new cluster to include the given event under consideration; and
if any one of the neighboring events belongs to an existing cluster, then assigning the given event to the existing cluster;
cluster sorting each of the clusters based on pre-selected parameters so that only those clusters that are likely to be associated with an object of interest are assigned as active clusters;
cluster tracking each of the active clusters by periodically sampling a centroid of each active cluster over time and determining direction results associated with each active cluster; and
outputting the detection results associated with each active cluster.

2. The method for improving motion detection in an event camera having a sensor for generating events according to claim 1, wherein the filtering further comprises temporally filtering each of the partitioned events by holding each event position, (x, y) for a pre-selected temporal threshold, $\tau_t$, and rejecting any subsequent events that occur within that window at the held position, (x, y).

3. The method for improving motion detection in an event camera having a sensor for generating events according to claim 1, wherein the filtering further comprises temporally filtering each particular event of the partitioned events, the temporally filtering further comprising:
reading a top of the event buffer at the (x, y) location of the particular event to obtain a timestamp, t, of a most recent buffered event at the (x, y) location;
if the timestamp, t, is within a pre-selected temporal threshold, $\tau_t$, then discarding the particular event; and
if the timestamp, t, is outside the pre-selected temporal threshold, $\tau_t$, then passing the particular event to the noise filtering.

4. The method for improving motion detection in an event camera having a sensor for generating events according to claim 1, wherein the filtering further comprises pre-filtering each particular event of the partitioned events, the pre-filtering comprising:
establishing a set time per event, $\tau_e$, allocated for processing the particular event received by an event handling instance associated with a partition; and
if a subsequent event of the partitioned events arrives at the event handling instance associated with the partition while the particular event is still processing, ignoring and discarding the subsequent event.

5. The method for improving motion detection in an event camera having a sensor for generating events according to claim 1, wherein the buffering the filtered events further comprises:
for each incoming filtered event, establishing a spatio-temporal neighborhood consisting of all buffered events from pixels immediately adjacent to an (x, y) location of the incoming filtered event and occurring within a pre-established filter time threshold, $\tau_f$, of t, the timestamp of the incoming filtered event;
counting a number of adjacent events, $n_e$, falling within the spatio-temporal neighborhood;
assembling a set of adjacent clusters, A, from clusters assigned to neighboring events within a clustering threshold, $\tau_c$, of the timestamp t, of the incoming filtered event; and
if $n_e > n_c$, where $n_c$ is a pre-selected clustering count threshold, then the incoming filtered event is stored as a buffered event and considered for clustering.

6. The method for improving motion detection in an event camera having a sensor for generating events according to claim 5, wherein $n_c=4$.

7. The method for improving motion detection in an event camera having a sensor for generating events according to claim 1, the method further comprising buffer flushing, wherein the buffer flushing comprises:
periodically flushing any events stored in the event buffer that are older than both $\tau_f$ and $\tau_c$; and
updating any affected clusters in the cluster buffer.

8. The method for improving motion detection in an event camera having a sensor for generating events according to claim 1, wherein the cluster sorting further comprises:
periodically sorting all clusters in the cluster buffer by total number of buffered events belonging to each cluster; and
ranking each cluster by the number of buffered events belonging to each cluster.

9. The method for improving motion detection in an event camera having a sensor for generating events according to claim 1, wherein the cluster tracking further comprises:
assigning a cluster of decreasing rank to a cluster tracking instance for tracking until its rank reaches zero;
periodically recording cluster centroid position over a long-term window of time, $T_v$;
calculating long-term velocity, v, by comparing an oldest centroid position, $c_v$, with a current centroid position, c, and dividing by $T_v$.

10. The method for improving motion detection in an event camera having a sensor for generating events according to claim 1, wherein the cluster tracking further comprises:

assigning a cluster of decreasing rank to a cluster tracking instance for tracking until its rank reaches zero;

periodically recording cluster centroid position over a short-term window of time, $T_u$;

calculating short-term velocity, u, by comparing an oldest centroid position, $c_u$, with a current centroid position, c, and dividing by $T_u$.

11. The method for improving motion detection in an event camera having a sensor for generating events according to claim 1, wherein the method is configured to track and identify marine vessels on water surface.

12. A real time event-based detection and tracking system, the system comprising:

an event camera having a sensor configured to generate events, each event having a position, (x, y) and timestamp, t;

a motion tracking engine, comprising:

data storage having an event buffer and a cluster buffer;

program storage, the program storage configured to store a computer program, the computer program configured with instructions for implementing a method for detecting and tracking objects in motion, the method comprising:

receiving the events from the sensor, wherein each event includes a position, (x, y) on the sensor and a timestamp, t;

partitioning each event sequentially in order of increasing timestamp, t, thereby generating partitioned events each associated with a particular partition in a grid of partitions according to the position, (x, y) on the sensor;

filtering each of the partitioned events within each of the particular partitions, wherein the filtering comprises noise filtering each of the partitioned events and allowing the partitioned events to pass the noise filtering as filtered events if concentrated in a predefined area within the particular partition;

buffering the filtered events in an event buffer to generate buffered events, the buffered events stored in a 3-dimensional array by the position, (x, y) on the sensor and the timestamp, t;

determining a pre-defined spatio-temporal neighborhood for each of the buffered events;

clustering each of the buffered events in a cluster buffer by comparing a pre-defined spatio-temporal neighborhood for each of the buffered events with all other buffered events located within the predefined spatio-temporal neighborhood to obtain neighboring events relative to a given event under consideration:

if none of the neighboring events belong to an existing cluster, then forming a new cluster to include the given event under consideration; and if any one of the neighboring events belongs to an existing cluster, then assigning the given event to the existing cluster;

cluster sorting each of the clusters based on pre-selected parameters so that only those clusters that are likely to be associated with an object of interest are assigned as active clusters;

cluster tracking each of the active clusters by periodically sampling a centroid of each active cluster over time and determining direction results associated with each active cluster; and outputting the detection results associated with each active cluster; and a processor in communication with the event camera, the data storage and the program storage, the processor configured to execute the instructions in response to receiving the events from the event camera.

13. The real time event-based detection and tracking system according to claim 12, wherein the filtering further comprises temporally filtering each of the partitioned events by holding each event position, (x, y) for a pre-selected temporal threshold, $\tau_t$, and rejecting any subsequent events that occur within that window at the held position, (x, y).

14. The real time event-based detection and tracking system according to claim 12, wherein the filtering further comprises temporally filtering each particular event of the partitioned events, the temporally filtering further comprising:

reading a top of the event buffer at the (x, y) location of the particular event to obtain a timestamp, t, of a most recent buffered event at the (x, y) location;

if the timestamp, t, is within a pre-selected temporal threshold, $\tau_t$, then discarding the particular event; and if the timestamp, t, is outside the pre-selected temporal threshold, $\tau_t$, then passing the particular event to the noise filtering.

15. The real time event-based detection and tracking system according to claim 12, wherein the filtering further comprises pre-filtering each particular event of the partitioned events, the pre-filtering comprising:

establishing a set time per event, $\tau_e$, allocated for processing the particular event received by an event handling instance associated with a partition; and if a subsequent event of the partitioned events arrives at the event handling instance associated with the partition while the particular event is still processing, ignoring and discarding the subsequent event.

16. The real time event-based detection and tracking system according to claim 12, wherein the buffering the filtered events further comprises:

for each incoming filtered event, establishing a spatio-temporal neighborhood consisting of all buffered events from pixels immediately adjacent to an (x, y) location of the incoming filtered event and occurring within a pre-established filter time threshold, $\tau_f$, of t, the timestamp of the incoming filtered event;

counting a number of adjacent events, $n_e$, falling within the spatio-temporal neighborhood;

assembling a set of adjacent clusters, A, from clusters assigned to neighboring events within a clustering threshold, $\tau_c$, of the timestamp t, of the incoming filtered event; and if $n_e > n_c$, where $n_c$ is a pre-selected clustering count threshold, then the incoming filtered event is stored as a buffered and considered for clustering.

17. The real time event-based detection and tracking system according to claim 16, wherein $n_c=4$.

18. The real time event-based detection and tracking system according to claim 12, the method further comprising buffer flushing, wherein the buffer flushing comprises:

periodically flushing any events stored in the event buffer that are older than both $\tau_f$ and $\tau_c$; and updating any affected clusters in the cluster buffer.

19. The real time event-based detection and tracking system according to claim 12, wherein the cluster sorting further comprises:

periodically sorting all clusters in the cluster buffer by total number of buffered events belonging to each cluster; and ranking each cluster by the number of buffered events belonging to each cluster.

20. The real time event-based detection and tracking system according to claim 12, wherein the cluster tracking further comprises:
   assigning a cluster of decreasing rank to a cluster tracking instance for tracking until its rank reaches zero;
   periodically recording cluster centroid position over a long-term window of time, $T_v$;
   calculating long-term velocity, v, by comparing an oldest centroid position, $c_v$, with a current centroid position, c, and dividing by $T_v$.

21. The real time event-based detection and tracking system according to claim 12, wherein the cluster tracking further comprises:
   assigning a cluster of decreasing rank to a cluster tracking instance for tracking until its rank reaches zero;
   periodically recording cluster centroid position over a short-term window of time, $T_u$;
   calculating short-term velocity, u, by comparing an oldest centroid position, $c_u$, with a current centroid position, c, and dividing by $T_u$.

22. The real time event-based detection and tracking system according to claim 12, wherein the system is configured to track and identify marine vessels on water surface.

23. The real time event-based detection and tracking system according to claim 12, wherein the processor is selected from the group consisting of: a single monolithic processor, multiple monolithic processors and multiple processor cores.

* * * * *